United States Patent [19]

Ohata et al.

[11] Patent Number: 5,286,699
[45] Date of Patent: Feb. 15, 1994

[54] EXHAUST GAS PURIFYING CATALYST SUPPRESSING THE GENERATION OF HYDROGEN SULFIDE AND METHOD OF MAKING THE CATALYST

[75] Inventors: Tomohisa Ohata; Kazuo Tsuchitani; Eiichi Shiraiashi, all of Himeji, Japan

[73] Assignee: Nippon Shokubai Kagaku Kogyo Co., Ltd., Osaka, Japan

[21] Appl. No.: 812,849

[22] Filed: Dec. 20, 1991

Related U.S. Application Data

[63] Continuation of Ser. No. 671,658, Mar. 19, 1991, abandoned, which is a continuation of Ser. No. 367,259, Jun. 16, 1989, abandoned.

[30] Foreign Application Priority Data

Dec. 9, 1988 [JP] Japan ................................. 1-310169

[51] Int. Cl.$^5$ ............................................. B01J 23/00
[52] U.S. Cl. ......................................... 502/304; 502/527
[58] Field of Search ............................... 502/304, 527

[56] References Cited

U.S. PATENT DOCUMENTS

| | | | |
|---|---|---|---|
| 3,458,276 | 7/1969 | Bloch ............................................ | 23/2 |
| 3,903,020 | 9/1975 | Sergeys et al. .......................... | 502/304 X |
| 4,153,579 | 5/1979 | Summers et al. ....................... | 502/304 |
| 4,189,404 | 2/1980 | Keith et al. .............................. | 502/304 |
| 4,369,132 | 1/1983 | Kinoshita et al. ..................... | 252/466 PT |
| 4,476,246 | 10/1984 | Kim et al. ................................ | 502/304 |
| 4,504,598 | 3/1985 | Ono et al. ............................... | 502/304 X |
| 4,591,580 | 5/1986 | Kim et al. ............................... | 502/304 X |
| 4,621,071 | 11/1986 | Blanchard et al. .................. | 502/304 X |
| 4,624,941 | 11/1986 | Berndt et al. ........................... | 502/304 |
| 4,654,319 | 3/1987 | Kim et al. ............................... | 502/304 |
| 4,678,770 | 7/1987 | Wan et al. ............................... | 502/304 |
| 4,708,946 | 11/1987 | Ohata et al. ............................ | 502/304 |
| 4,738,947 | 4/1988 | Wan et al. ............................... | 502/304 |
| 4,760,044 | 7/1988 | Joy, III et al. ......................... | 502/304 X |
| 4,780,447 | 10/1988 | Kim et al. ............................... | 502/304 X |
| 4,782,038 | 11/1988 | Ghandi et al. ......................... | 502/304 |
| 4,798,819 | 1/1989 | Lewes et al. ........................... | 502/304 |
| 4,806,519 | 2/1989 | Chiba et al. ............................ | 502/304 X |
| 4,843,056 | 6/1989 | Matsumoto et al. ................. | 502/304 X |

FOREIGN PATENT DOCUMENTS 0244127 11/1987 European Pat. Off. .
1330843 9/1973 United Kingdom .

*Primary Examiner*—George Fourson
*Attorney, Agent, or Firm*—Sherman and Shalloway

[57] ABSTRACT

An exhaust gas purifying catalyst suppressing the generation of hydrogen sulfide obtained by coating and supporting on a honeycomb carrier of a monolithic structure a catalyst composition containing (a) activated alumina supporting platinum and/or palladium in the range of 5 to 30 weight % and rhodium in the range of 1 to 20 weight %, (b) a cerium oxide and (c) activated alumina, and optionally (d) an alkali metal and/or (e) a nickel oxide.

7 Claims, No Drawings

EXHAUST GAS PURIFYING CATALYST SUPPRESSING THE GENERATION OF HYDROGEN SULFIDE AND METHOD OF MAKING THE CATALYST

This application is a continuation of application Ser. No. 07/671,658, filed Mar. 19, 1991, which is a continuation of application Ser. No. 07/367,259, filed Jun. 16, 1989, both now abandoned.

The present invention relates to an exhaust gas purifying catalyst. More particularly, it relates to an exhaust gas purifying three way catalyst which simultaneously removes off hydrocarbon (HC), carbon monoxide (CO) and nitrogen oxides ($NO_x$) being noxious components contained in exhaust gases from internal combustion engines of automobiles and suppresses the generation and emission of hydrogen sulfide ($H_2S$).

Purifying catalysts for exhaust gases emitted from the internal combustion engines of automobiles have heretofore been proposed a lot and practically used. In the beginning oxidation catalysts to remove off HC and CO were practically used, but it is a three way catalyst to simultaneously remove off $NO_x$ in addition to CO and HC that leads nowadays in terms of more and more rigorous regulations. This three way catalyst functions to simultaneously carry out the oxidation reactions of CO and HC and reduction reactions of $NO_x$. However, traces of sulfur compounds are contained in fuel gasoline and emitted as sulfur oxides ($SO_x$) in exhaust gases. In the case of purifying these exhaust gases with the three way catalyst, when gases emitted from the internal-combustion engine are present in a reducing zone, $SO_x$ in the exhaust gases is reduced to hydrogen sulfide ($H_2S$) by the catalytic action of the three way catalyst and emitted. $H_2S$ not only smells but also are harmful to the human body and hence, the advent of a catalyst which suppresses the generation and emission of $H_2S$ and which has excellent CO, HC and $NO_x$ activity is strongly demanded.

Heretofore, catalysts aiming at suppression of the generation of $H_2S$ have been proposed in the U.S. Pat. No. 4,760,044 and the European Patent 0244127. These both patents disclose methods of capturing $H_2S$ generated by the action of the catalyst, mainly a noble metal, by a metal added in the catalyst which tends to form metal sulfide, such as Ni, Co, Cu, Pb, Zn and the like, and thereby suppressing the emission of $H_2S$.

With the eye set to the fact that $H_2S$ is generated by the reaction of $SO_x$ in exhaust gases and $SO_x$ stored in the catalyst with $H_2$ by the catalytic action of the noble metal in a reducing atmosphere, the instant inventors continued their studies strenuously, in consequence of which they found that the generation and emission of $H_2S$ could considerably be suppressed without spoiling conventional catalytic functions to purify CO, HC and $NO_x$ by controlling noble metal dispersed condition. The instant inventors also found that the generation and emission of $H_2S$ could be suppressed more effectively by further addition of an alkali metal and/or Ni oxide having specified physical properties, particularly specified particle diameters, to said catalyst controlled for its noble metal dispersed condition.

Heretofore, in automobile exhaust gas purifying catalysts, noble metals, the main active element, are so expensive that amounts of them used are restricted to traces and hence, it has been thought to be important to keep the noble metal in highly dispersed condition insofar as possible. The catalyst in which the noble metal is held in highly dispersed condition, however, is, true, higher in its initial activity, but because of the high dispersion, rather, the particle growth of the noble metal occurs rapidly during its long-term use, or because the noble metal reacts with the carrier substrate ($Al_2O_3$ or the like) or promotor element ($CeO_2$ or the like) in the catalyst, it entails the defect that the catalyst is inferior in durability of functions. Further, the higher is the dispersion of the noble metal, the more is $H_2S$ formed and because of this, it forms the cause for $H_2S$ smelling problems in conventional catalyst-mounted automobiles. In general, for the way of lowering the degree of noble metal dispersion are available a method of using a carrier substrate being weak in noble metal adsorbability, a method of using a noble metal salt being weak in absorbability to the carrier substrate, a method of once supporting on a carrier substrate a noble metal highly dispersed therein and then carrying out high temperature treatment or the like thereby causing a lowering of the degree of its dispersion, and the like. True, $H_2S$ is less generated with catalysts prepared by such method, but they are found not only to be lower in their initial activities in CO, HC and $HO_x$ but also to be inferior in their durability.

It was very difficult in prior art to support the noble metal in such a manner as to suppress the generation of $H_2S$ without impairing CO, HC and $NO_x$ activity as mentioned above. In fact, in U.S. Pat. No. 4,760,044 and European Patent 02244127 noble metals are thought to be used in highly dispersed condition, and it was not found at all that the durability or improvement of the CO, HC and $NO_x$ activity and the suppression of the generation of $H_2S$ are compatible by the control over noble metal dispersed condition as disclosed in the present invention. For which the present invention could achieve the solution of this difficult problem by the below-mentioned method for control over noble metal dispersed condition.

In the present invention a small amount of activated alumina supporting, from among noble metals, platinum (Pt) and/or palladium (Pd) in the range of 5 to 30 weight % and rhodium in the range of 1 to 20 weight %, viz., a small amount of activated alumina supporting the noble metal with as high a concentration not seen at all in conventional automobile exhaust gas purifying catalysts as to be 6 to 50 weight % in total, is dispersed in a great amount of activated alumina on which no noble metal is supported thereby noble metal dispersed condition is controlled to be lowered. By this supporting way the generation of $H_2S$ is suppressed and at the same time, the noble metal is contacted with cerium oxide through the activated alumina containing no noble metal and hence, the reaction of the noble metal with the cerium oxide causing the deterioration of catalytic functions is mitigated and durability of the primary catalytic function of purifying CO, HC and $NO_x$ is also improved.

Another feature of the present invention resides in addition of an alkali metal and/or Ni oxide (preferably Ni oxide having specified physical properties). Alkali metal-added catalysts have heretofore been proposed in Japanese Laid-Open Patent Application KOKAI Nos. 133488/79, 15643/80, 102940/81 and the like, but these catalysts are all used as promotors for CO, HC and $NO_x$ activity and the effect of suppressing the generation of $H_2S$ is not found at all. The instant inventors found that alkali metals serve the function of suppressing the storage of $SO_x$ in combination with alumina or cerium in the catalyst and the reduction of $SO_x$ to $H_2S$ by the action of the noble metal. Furthermore, the Ni oxide is thought to suppress the emission of $H_2S$ by capturing $H_2S$ as disclosed in U.S. Pat. No. 4,760,044 and European Paent 0244127, but the instant inventors found that the Ni oxide is most effective for the suppression of $H_2S$ when its paricle diameter falls in the range of 0.1 to 10 microns, but when it falls outside this range, Ni rather promotes the generation of $H_2S$ or shows hardly any inhibitory effect.

In the catlyst of the invention, the generation of $H_2S$ which is reduced by the novel way of supporting the noble metal is further reduced by such addition effect of the alkali metal and/or Ni oxide, in consequence of which smelling problems have come to be nearly solved.

The catalyst of the present invention is prepared by coating and supporting on a honeycomb carrier of a monolithic structure a catalyst composition containing "(a) activated alumina supporting platinum and/or palladium in the range of 5 to 30 weight % and rhodium in the range of 1 to 20 weight %" (the first feature) and "an alkali metal and/or nickel oxide" (the second feature) with (b) a cerium oxide and (c)activated alumina not supporting the noble metal.

In activated alumina (a) as the first feature of the present invention, viz., activated Alumina (a) supporting the noble metal with as high a concentration as not to be seen at all in the instant field in the prior art, platinum and/or palladium is supported in the range of 5 to 30 weight %, preferably 10 to 20 weight %, and rhodium is supported in the range of 1 to 20 weight %, preferably 1 to 10 weight %. If platinum and/or palladium is supported with a concentration less than 5 weight % and rhodium is supported with a concentration less than 1 weight %, noble metal supported condition approaches its highly dispersed condition as is the case with conventional catlysts, and the generation of $H_2S$ cannot be suppressed. On the other hand, if the concentration of platinum and/or palladium supported is in excess of 30 weight % or the concentration of rhodium supported is in excess of 20 weight %, because of less active sites of the noble metal contributing to CO, HC and $NO_x$ purification reactions from the beginning, the catalyst goes insufficient in its initial activity, and during the use of the catalyst the particle growth of the noble metal not seen in the case where the concentrations of the noble metal supported falls in the specified range of the present invention takes place, with the result that they grow into macroparticles, causing a considerable lowering of CO, HC and $NO_x$ activity.

As noble metal sources used chloroplatinic acid, dinitrodiammine platinum, platinum-sulfite complex salt, platinum tetramine chloride, palladium chloride, palladium nitrate, palladium-sulfite complex salt, palladium tetramine chloride, rhodium chloride, rhodium nitrate, rhodium sulfate, rhodium-sulfite complex salt, rhodium-ammine complex salt and the like are preferable. The amount of the noble metal supported should preferably set as falling in the range of 0.1 to 10 g per litre of catalyst.

As activated alumina supporting the noble metal with a high concentration activated alumina with a specific surface area of 5 to 200 $m^2/g$ is preferable, and as its crystal form one which takes $\gamma$, $\delta$, $\theta$, $\alpha$, $\chi$, $\kappa$ or $\eta$ form is usable. Further, activated alumina containing supported thereon as oxide 0.1 to 30 weight % of at least one of rare earth elements, such as lanthanum, neodymium and the like, alkaline earth elements, such as calcium, barium and the like, and further metal elements, such as chromium, manganese, iron, cobalt, zirconium and the like, is also usable. Powdery or granular activated alumina having said physical properties is impregnated with a solution of said noble metal source, thoroughly dried at 100° to 250° C. and then calcined in air or reducing gas, such as nitrogen, hydrogen or the like, at a temperature of 250° to 500° C. for 1 to 5 hours thereby activated alumina (a) supporting the noble metal with a high concentration is prepared.

The same one as said activated alumina (a) is suitably used for the activated alumina (c) not supporting the noble metal. However, a big difference between the activated alumina (c) and the activated alumina (a) lies, apart from not containing the noble metal, in the amount of it used in the catalyst. That is, the activated alumina (a) is used in as small an amount as 1 to 20 g per litre, for which the activated alumina (c) is used in as great an amount as 50 to 200 g per litre.

As alkali metals used in the present invention sodium, potassium, rubidium and cesium are cited. Of these, potassium is more preferred. The amount of the alkali metal supported is 0.5 to 30 g, preferably 0.5 to 20 g, as metal, per litre of catalyst. If this amount of the alkali metal supported is too great, the noble metal is spoiled for its CO, HC and $NO_x$ activity. When it is too small, the resultant $H_2S$ suppressing effect is far from satisfactory. For the way of supporting the alkali metal there is usually taken a method of impregnating activated alumina (c) not supporting the noble metal with a solution of alkali metal nitrate, thoroughly drying at 100° to 250° C. and then calcining in air at 250° to 600° C. for 1 to 5 hours, but apart from that, one may take a method of immersing a finished catalyst in an alkali metal solution or alkali metal-containing slurry thereby supporting the alkali metal. As alkali metal sources, other than nitrates, hydroxides, carbonates, sulfates or chlorides may be used and $H_2S$ suppressing effect will no way be spoiled by their use.

In the present invention $H_2S$ suppressing effect is more completely ensured by addition of a nickel oxide and this effect depends on the physical property of the nickel oxide. Strictly speaking, the nickel oxide must be dispersed in the catalyst with an average particle diameter of 0.1 to 10 microns, preferably 0.5 to 7 microns. When aqueous nickel solution is used as in U.S. Pat. No. 4,760,044, for instance, the nickel oxide supported becomes less than 0.1 micron fine particles, but in such a case, the nickel oxide produces less $H_2S$ suppressing effect and rather, it sometimes promotes the generation of $H_2S$. On the other hand, when the nickel oxide is more than 10 microns in its average particle diameter, the resultant $H_2S$ suppressing effect is not sufficient. Furher, the amount of the nickel oxide added is 0.5 to 30 g, preferably 1 to 20 g, per litre of catalyst. Its too less addition results in insufficient $H_2S$ suppressing effect, whereas its too great addition adversely affects CO, HC and $NO_x$ activity. The nickel oxide is usually mixed with a slurry of other catalyst composition or the nickel oxide and other catalyst composition are simultaneously slurried thereby a nickel oxide-containing slurry is prepared. It is supported as a coating on a honeycomb carrier of a monolithic structure. As another supporting method it may be supported by further coating a nickel oxide-containing slurry on a finshed catalyst.

The cerium oxide (b) used in the present invention is usually recognized widely as an indispensable element of automobile catalysts and consequently, it is not the component by which the present invention is particularly characterized. For the amount of it used favorable CO, HC and $NO_x$ activity is obtained by setting it at 10 to 150 g per litre of catalyst.

For a honeycomb carrier of a monolithic structure used in the present invention it is sufficient to use one which is usually called a cermic honeycomb carrier. Particularly preferred are honeycomb carriers using, as material, cordierite, mullite, alpha-alumina, zirconia, titania, titanium phospahte, aluminum titanate, pentalite, spondumene, alumino-silicate, magnesium silicate and the like, and of these, cordierite ones are more preferred for internal combustion engines, in particular. Apart from that, those which are of monolithic structure made by the use of oxidation and heat resistant metals, such as stainless steel, Fe-Cr-Al alloy and the like, are used. These monolithic carriers are prepared by the extrusion molding method, method of rolling and hardening a sheet-like element and the like. The form of their gas passage port (cell shape) may be either haxagonal, tetragonal, trigonal or corrugation type. For cell density (cell numbers/unit cross-section), if it is 150 to 600 cells/square inch, it is sufficiently usable, and favorable results are given.

The present invention will be explained in further detail with the reference to Examples, but needless to say, the present invention will no way be limited to these Examples.

EXAMPLE 1

A catalyst was prepared using a commercially available cordierite monolithic carrier (made by NGK Insulators Ltd.). This monolithic carrier was a cylindrical one having about 400 gas channel cells per square inch in its cross-section, 33 mm in outer diameter, 76 mm in length and about 65 ml in volume.

An aqueous nitric acid aolution of dinitrodiammine platinum containing 1.5 g as platinum (Pt) and an aqueous rhodium nitrate solution containing 0.3 g as rhodium (Rh) were mixed, this aqueous solution and 7.5 g of activated alumina with a specific surface area of 100 m$^2$/g were mixed, thoroughly dried and then calcined in air at 400° C. for 2 hours thereby Pt-Rh-containing alumina was prepared.

In the next place, 38.8 g of potassium nitrate ($KNO_3$) was dissolved in 300 ml of deionized water, mixed with 128 g of the same activated alumina as the above, thoroughly dried and then calcined in air at 500° C. for 1 hour thereby 146 g of potassium-containing alumina was prepared.

This potassium-containing alumina, said Pt-Rh-containing alumina and 75 g of commercially available powdered cerium oxide (made by Nissan Rare Metals & Chemicals Co., Ltd.) were wet pulverized for 20 hours in a ball mill thereby an aqueous slurry for coating was prepared.

Said monolithic carrier was immersed with this slurry for coating, taken out and then excess slurry in cells was air-blown to rid all cells of plugging. Then it was dried at 130° C. for 3 hours thereby catalyst (a) was obtained.

This catalyst supported 10 g potassium, 90 g alumina, 50 g cerium oxide, 1.0 g Pt and 0.2 g Rh per litre.

EXAMPLE 2

21.5 g of potassium hydroxide (KOH) used instead of potassium nitrate in Example 1 was dissolved in 100 ml of deionized water, the resultant solution was mixed with 128 g of activated alumina used in Example 1, thoroughly dried and then calcined in air at 500° C. for 1 hour thereby potassium-containing alumina was prepared. After that the same operation as in Example 1 was conducted thereby catalyst (b) was obtained.

This catalyst supported 10 g potassium, 90 g alumina, 50 g cerium oxide, 1.0 g Pt and 0.2 g Rh per litre.

EXAMPLE 3

55.5 g of sodium nitrate ($NaNO_3$) was dissolved in 100 ml of deionized water and the resultant solution was mixed with 128 g of activated alumina used in Example 1. It was thoroughly dried and then calcined in air at 500° C. for 1 hour thereby sodium-containing alumina was prepared. Finished catalyst (c) was obtained in like manner as in Example 1 except that said sodium-containing alumina was used instead of potassium-containing alumina.

This catalyst supported 10 g sodium, 90 g alumina, 50 g cerium oxide, 1.0 g Pt and 0.2 g Rh per litre.

EXAMPLE 4

20.3 g of rubidium carbonate ($Rb_2CO_3$) was dissolved in 100 ml of deionized water and the resultant solution was mixed with 128 g of activated alumina used in Example 1. It was thoroughly dried and then calcined in air at 500° C. for 1 hour thereby rubidium-containing alumina was prepared. Finished catalyst (d) was obtained in like manner as in Example 1 except that said rubidium-containing alumina was used instead of potassium-containing alumina.

This catalyst supported 10 g rubidium, 90 g alumina, 50 g cerium oxide, 1.0 g Pt and 0.2 g Rh per litre.

EXAMPLE 5

19.0 g of cesium (CsCl) was dissolved in 100 ml of deionized water and the resultant solution was mixed with 128 g of activated alumina used in Example 1. It was thoroughly dried and then calcined in air at 500° C. for 1 hour thereby cesium-containing alumina was prepared. Finished catalyst (e) was obtained in like manner as in Example 1 exept that said cesium-containing alumina was used instead of potassium-containing alumina.

This catalyst supported 10 g cesium, 90 g alumina, 50 g cerium oxide, 1.0 g Pt and 0.2 g Rh per litre.

EXAMPLE 6

A slurry was prepared by following the same procedure as in Example 1 except that 7.5 g of nickel oxide (particle diameter 3 microns) was added and the amount of potassium-containing alumina used was set at 120 g at the time of wet pulverization thereby catalyst (f) was prepared.

This catalyst supported 10 g potassium, 85 g alumina, 50 g cerium oxide, 1.0 g Pt, 0.2 g Rh and 5 g nickel oxide per litre.

EXAMPLE 7

Finished catalyst (g) was obtained in like manner as in Example 1 except that 142 g of the same pure activated alumina as used in Example 1 was used instead of potassium-containing alumina.

This catalyst supported 100 g alumina, 50 g cerium oxide, 1.0 g Pt and 0.2 g Rh per litre.

COMPARISON EXAMPLE 1

An aqueous nitric acid solution of dinitrodiammine platinum containing 1.5 g as Pt and an aqueous rhodium nitrate solution containing 0.3 g as Rh were mixed and this mixed solution was mixed with 150 g of the same activated alumina as used in Example 1. It was dried and calcined at 400° C. for 2 hours thereby powdered alumina supporting dispersed therein 1.0 weight % of Pt and 0.2 weight % Rh was prepared. This powder and 75 g of the same cerium oxide as used in Example 1 were pulverized for 20 hours in the ball mill to prepare an aqueous slurry for coating thereby catalyst (h) was obtained.

This catalyst supported 100 g alumina, 50 g cerium oxide, 1.0 g Pt and 0.2 g Rh per litre.

COMPARISON EXAMPLE 2

An aqueous nitric acid solution of dinitrodiammine platinum containing 1.5 g as Pt, aqueous rhodium nitrate solution containing 0.3 g as Rh and aqueous solution of 38.8 g of potassium nitrate in 300 ml of deionized water were mixed and this mixed solution was mixed with 135 g of activated alumina used in Example 1. It was dried and calcined at 500° C. for 2 hours thereby potassium-containing alumina supporting dispersed therein 1.1 weight % of Pt and 0.2 weight % of Rh was prepared.

Catalyst (i) was obtained by operating in like manner as in Comparison Example 1 except that this alumina containing Pt, Rh and potassium and 75 g of cerium oxide used in Example 1 were used.

This catalyst supported 10 g potassium, 90 g alumina, 50 g cerium oxide, 1.0 g Pt and 0.2 g Rh per litre.

COMPARISON EXAMPLE 3

An aqueous nitric acid solution of dinitrodiammine platinum containing 1.5 g as Pt and aqueous rhodium nitrate solution containing 0.3 g as Rh were mixed, and 142 g of activated alumina used in Example 1 was impregnated with this mixed solution, dried and calcined thereby powdered alumina supporting dispersed therein 1.0 weight % of Pt and 0.21 weight % of Rh was prepared. This powder was pulverized in the ball mill together with 7.5 g of nickel oxide used in Example 6 and 75 g of cerium oxide used in Example 1 to prepare an aqueous slurry thereby catalyst (j) was prepared.

This catalyst supported 95 g alumina, 50 g cerium oxide, 1.0 g Pt, 0.2 g Rh and 5 g nickel oxide per liter.

COMPARISON EXAMPLE 4

144 g powdered alumina supporting dispersed therein 1.0 weight % of Pt and 0.21 weight % of Rh prepared in Comparison Example 3 and an aqueous solution of 29.2 g of nickel nitrate [$Ni(NO_3)_2 \cdot 6H_2O$] in 150 ml of deionized water were mixed and thoroughly dried. After that it was calcined in air at 500° C. for 1 hour thereby Pt, Rh and Ni-containing aluina was prepared. This Pt, Rh and Ni-containing alumina and 75 g of cerium oxide used in Example 1 were pulverized in the ball mill to prepare an aqueous slurry thereby catalyst (k) was prepared.

This catalyst supported 90 g alumina, 50 g liter.

EXAMPLE 8

Catalysts (a) to (k) prepared in Examples 1 to 7 and Comparison Examples 1 to 4 were tested for amounts of $H_2S$ generated and their catalyst activities. These both tests were conducted by following the below-mentioned procedures.

Test for Amounts of $H_2S$ Generated

A commercialy available electronic control type engine (4 cylindered, 1800 cc) was used and for fuel there was used gasoline in which thiophene was added so as to reach 0.1 weight % in the sulfur (s) content of the gasoline.

The engine was operated for 15 minutes at conditions of 500° C. in catalyst inlet temperature and 15.5 in A/F (air to fuel ratio) and after that, the A/F was changed to 13.0 and at the same time, sampling of gas for $H_2S$ measurement was begun and the $H_2S$ concentration of sample was measured gy JIS-K 0108 methylene blue-absorbance method.

Catalytic Activity Test

This test consists of (1) durability test of each of catalysts packed in a multi-cell convertor connected to an exhaust gas line from a commercially available electronic control type engine (8 cylinder 4400 cc), then (2) three way performance test and (3) light-off performance test.

(1) Durability Test

The engine was operated for 50 hours in a mode of repreating constant cruising for 60 seconds, and idling for 6 seconds (fuel was cut at the time of idling). Through the test the inlet temperature of the catalyst was kept 800° C. in the constant cruising.

(2) Three Way Performance Test

After said durability test, the engine (1800 cc) equipped with the multi-cell convertor was operated at the perturbation condition of ±0.5 A/F 1.0 Hz, and the catalyst inlet temperature and the space velocity were fixed at 400° C. and 90,000 $hr^{-1}$, respectively. CO, HC and NO conversion efficiencies were measured when its average A/F was changed from 15.1 to 14.1.

When the respective conversion efficiencies of CO, HC and NO were plotted on the ordinate and A/F was plotted on the abscissa, a point at which a CO conversion curve and NO conversion curve intersect is provided for as a cross-over point, and CO and NO conversion efficiency at this cross over point and HC conversion efficiency at A/F of the cross-over point were used as the criteria for the evaluation of the three way performance of the respective catalysts.

(3) Light-Off Performance Test

Using the same engine and space velocity as used in the three way performance test, A/F was set constant at 14.6 and the catalyst inlet temperature was changed from 200° C. to 450° C. thereby CO, HC and NO conversion efficiencies were determined.

Temperatures at which the respective conversion efficiency reached 50% were set as $T_{50}CO$, $T_{50}HC$, and $T_{50}NO$, and these were used as the criteria for the evaluation of the light-off performance.

Catalysts (a) to (k) were tested for amounts of $H_2S$ generated, their three way performances and light-off performances by the testing procedures mentioned above. The results were as shown in the following table.

| Cat-alyst | Three way performance Cross-over point | | Light-off performance | | | Amount of $H_2S$ generated (ppm) |
|---|---|---|---|---|---|---|
| | CO & NO (%) | HC (%) | $T_{50}CO$ (°C.) | $T_{50}HC$ (°C.) | $T_{50}NO$ (°C.) | |
| a | 87 | 93 | 350 | 357 | 347 | 5 |
| b | 87 | 93 | 352 | 357 | 348 | 5 |
| c | 86 | 92 | 351 | 358 | 346 | 10 |
| d | 86 | 93 | 350 | 355 | 348 | 10 |
| e | 87 | 92 | 352 | 356 | 348 | 15 |
| f | 86 | 93 | 353 | 358 | 346 | 5 or less |
| g | 87 | 93 | 349 | 356 | 347 | 25 |
| h | 85 | 92 | 365 | 373 | 360 | 105 |
| i | 84 | 93 | 367 | 374 | 363 | 45 |
| j | 86 | 91 | 352 | 372 | 357 | 40 |
| k | 82 | 89 | 370 | 379 | 365 | 115 |

It is noted from the data disclosed in the above table that in the case of using activated alumina supporting the noble metal with high concentrations according to the present invention or in the case of further using, as catalyst components, an alkali metal and/or nickel oxide the resulting suppressing effect on the generation of $H_2S$ is markedly great and that the catalysts of the present invention are excellent even in CO, HC and NO activity as compared with conventional catalysts.

We claim:

1. An exhaust gas purifying catalyst which suppresses the generation of hydrogen sulfide comprising a honeycomb carrier of a monolithic structure on which is coated and supported a catalyst composition containing (a) activated alumina on which is supported from 5 to 30 weight %, based on the weight of the active alumina, of platinum, palladium or a mixture of platinum and palladium and from 1 to 20 weight %, based on the weight of the active alumina, of rhodium, (b) a cerium oxide, (c) additional activated alumina free of platinum and palladium and optionally (d) alkali metal, wherein 1 to 20 g of the activated alumina (a), 50 to 200 g of the additional activated alumina (c) and 10 to 150 g, as $CeO_2$, of the cerium oxide (b) are supported per liter of the carrier.

2. The catalyst of claim 1 in which the alkali metal contains at least one member selected from the group consisting of sodium potassium, rubidium and cesium.

3. The catalyst of claim 1 in which the alkali metal is supported in the range of 0.5 to 30 g, as a metal, per litre of the catalyst.

4. An exhaust gas purifying catalyst which suppresses the generation of hydrogen sulfide which comprises a honeycomb carrier of a monolithic structure on which is coated and supported a catalyst composition containing (a) activated alumina on which is supported from 5 to 30 weight %, based on the weight of the activated alumina, of platinum and palladium, combined, and from 1 to 20 weight % based on the weight of activated alumina, of rhodium, (b) a cerium oxide, (c) additional activated alumina free of platinum and palladium and (e) a nickel oxide, wherein 1 to 20 g of the activated alumina (a), 50 to 200 g of the additional activated alumina (c), 10 to 150 g, as $CeO_2$, of the cerium oxide (b) and 1 to 30 g of the nickel oxide (e) are supported per liter of the carrier, in which the average particle diameter of the nickel oxide (d) is in the range of 0.1 to 10 microns.

5. An exhaust gas purifying catalyst which suppresses the generation of hydrogen sulfide which comprises a honeycomb carrier of a monolithic structure on which is coated and supported a catalyst composition containing (a) activated alumina on which is supported from 5 to 30 weight %, of platinum, palladium or a mixture of platinum and palladium and from 1 to 20 weight %, based on the weight of the active alumina of rhodium, (b) a cerium oxide and (c) additional activated alumina free of platinum and palladium, (e) a nickel oxide, an (d) and alkali metal, wherein 1 to 20 g of the activated alumina (a), 50 to 200 g of the additional activated alumina (c), 10 to 150 g of $CeO_2$, of the cerium oxide (b), and 0.5 to 30 g of the nickel oxide (e), and 0.5 to 30 g, as a metal, of the alkali metal (d) are supported per liter of the carrier, in which the average particle diameter of the nickel oxide (d) is in the range of 0.1 to 10 microns.

6. The catalyst of claim 5 in which the alkali metal is at least one member selected from the group consisting of sodium, potassium, rubidium and cesium.

7. A process for preparing a three-way exhaust gas purifying catalyst which is capable of suppressing the generation of hydrogen sulfide, said method comprising forming a slurry of a catalyst composition comprising (a) activated alumina on which is supported from 5 to 30% by weight of a noble metal selected from the group consisting of platinum, palladium and mixtures thereof, and from 1 to 20% by weight of rhodium, (b) cerium oxide, (c) additional activated alumina free of platinum and palladium, and optionally (d) alkali metal and optionally (e) nickel oxide, supporting the slurry on a honeycomb carrier of a monolithic structure and drying the slurry to obtain a coating of the catalyst composition on the honeycomb carrier, wherein the slurry contains the activated alumina (a), the cerium oxide (b) and the additional activated alumina (c) in an amount such that the coating contains from 1 to 20 g of component (a), 10 to 150 g, as $CeO_2$, of component (b) and 50 to 200 g of component (c), per liter of the honeycomb carrier.

* * * * *